United States Patent
Laddu et al.

(10) Patent No.: US 12,010,066 B2
(45) Date of Patent: Jun. 11, 2024

(54) APPARATUS, METHOD, AND COMPUTER PROGRAM FOR SCRAMBLING A TRANSPORT BLOCKED BASED ON WHETHER A PREVIOUS TRANSPORT BLOCK WAS SUCCESSFULLY RECEIVED

(71) Applicant: Nokia Technologies Oy, Espoo (FI)

(72) Inventors: Keeth Saliya Jayasinghe Laddu, Espoo (FI); Luca Rose, Orsay (FR); Fanny Jardel, La Norville (FR); Philippe Sehier, Saint Germain en Laye (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 336 days.

(21) Appl. No.: 17/624,493

(22) PCT Filed: Jul. 16, 2019

(86) PCT No.: PCT/EP2019/069075
§ 371 (c)(1),
(2) Date: Jan. 3, 2022

(87) PCT Pub. No.: WO2021/008685
PCT Pub. Date: Jan. 21, 2021

(65) Prior Publication Data
US 2022/0360412 A1     Nov. 10, 2022

(51) Int. Cl.
*H04L 5/00*     (2006.01)
*H04L 1/00*     (2006.01)
(Continued)

(52) U.S. Cl.
CPC .......... *H04L 5/0055* (2013.01); *H04L 1/0006* (2013.01); *H04L 1/16* (2013.01); *H04L 25/03866* (2013.01)

(58) Field of Classification Search
CPC ... H04L 1/0006; H04L 1/16; H04L 25/03866; H04L 5/0055; H04W 12/037
See application file for complete search history.

(56) References Cited

U.S. PATENT DOCUMENTS

| | | | | |
|---|---|---|---|---|
| 8,375,225 B1* | 2/2013 | Ybarra | ................... | G06F 21/85 |
| | | | | 713/153 |
| 9,425,959 B1* | 8/2016 | Pedersen | ............... | H04L 9/3242 |
| (Continued) | | | | |

FOREIGN PATENT DOCUMENTS

| | | | | |
|---|---|---|---|---|
| CN | 110830184 A | * | 2/2020 | ............... H04L 1/08 |
| EP | 1610582 A1 | | 12/2005 | |

OTHER PUBLICATIONS

"3rd Generation Partnership Project; Technical Specification Group Radio Access Network; NR; Multiplexing and channel coding (Release 15)", 3GPP TS 38.212, V15.6.0, Jun. 2019, pp. 1-101.
(Continued)

*Primary Examiner* — Shah M Rahman
(74) *Attorney, Agent, or Firm* — Robert P. Michal, Esq.; Carter, DeLuca & Farrell LLP

(57) ABSTRACT

An apparatus comprising: at least one processor; and at least one memory including computer program code; the at least one memory and the computer program code configured to, with the at least one processor, cause the apparatus at least to: determine (1006) whether at least one transport block has been successfully delivered to another apparatus; and determine (1008, 1010, 1012) whether to use the at least one transport block to scramble at least one subsequent transport block based on whether the at least one transport block has been successfully delivered to the apparatus.

11 Claims, 12 Drawing Sheets

(51) Int. Cl.
    *H04L 1/16*     (2023.01)
    *H04L 25/03*    (2006.01)

(56) References Cited

U.S. PATENT DOCUMENTS

| | | | |
|---|---|---|---|
| 2005/0281407 A1* | 12/2005 | Lee | H04W 12/037 |
| | | | 380/210 |
| 2008/0025509 A1* | 1/2008 | Van De Ven | H04L 9/0637 |
| | | | 380/210 |
| 2011/0176443 A1 | 7/2011 | Astely et al. | |
| 2015/0016353 A1* | 1/2015 | Lee | H04L 1/1854 |
| | | | 370/329 |
| 2015/0282130 A1* | 10/2015 | Webb | H04L 5/0055 |
| | | | 370/329 |
| 2016/0072610 A1* | 3/2016 | Goulahsen | H04K 1/00 |
| | | | 380/255 |
| 2017/0325240 A1 | 11/2017 | Sorrentino | |
| 2018/0278443 A1* | 9/2018 | Li | H04N 5/913 |
| 2019/0052487 A1* | 2/2019 | Shelby | H03M 13/13 |
| 2019/0364568 A1* | 11/2019 | Zhang | H04L 1/1896 |
| 2020/0083990 A1* | 3/2020 | Mauritz | H04L 1/1861 |
| 2020/0112403 A1* | 4/2020 | Liu | H04L 1/1896 |
| 2021/0136695 A1* | 5/2021 | Liu | H04L 1/0001 |
| 2021/0219329 A1* | 7/2021 | Zhou | H04L 1/189 |

OTHER PUBLICATIONS

International Search Report and Written Opinion received for corresponding Patent Cooperation Treaty Application No. PCT/EP2019/069075, dated Mar. 10, 2020, 13 pages.

\* cited by examiner

APPARATUS, METHOD, AND COMPUTER PROGRAM FOR SCRAMBLING A TRANSPORT BLOCKED BASED ON WHETHER A PREVIOUS TRANSPORT BLOCK WAS SUCCESSFULLY RECEIVED

RELATED APPLICATION

This application claims priority to PCT Application No. PCT/EP2019/069075, filed on Jul. 16, 2019, each of which is incorporated herein by reference in its entirety.

FIELD OF THE DISCLOSURE

The present disclosure relates to an apparatus, a method, and a computer program for performing data transmissions in a cellular network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is 2G system (2GS) using global system for mobile communications (GSM) radio access technology, 3G system (3GS) using universal mobile telecommunications system (UMTS) radio access technology, 4G system (4GS) using long-term evolution—advanced (LTE-A) radio access technology or 5G system (5GS) using new radio (NR) radio access technology.

SUMMARY

According to an aspect there is provided an apparatus comprising at least one processor and at least one memory including computer code for one or more programs, the at least one memory and the computer code configured, with the at least one processor, to cause the apparatus at least to: determine whether at least one transport block has been successfully delivered to another apparatus; and determine whether to use the at least one transport block to scramble at least one subsequent transport block based on whether the at least one transport block has been successfully delivered to the other apparatus.

The at least one memory and the computer program code may be configured to, with the at least one processor, cause the apparatus at least to: determine that the at least one transport block has been successfully delivered to the other apparatus; and determine to use the at least one transport block to scramble the at least one subsequent transport block.

The at least one memory and the computer program code may be configured to, with the at least one processor, cause the apparatus at least to: determine that the at least one transport block has not been successfully delivered to the other apparatus; determine that at least one previous transport block has been successfully delivered to the other apparatus; and determine to use the at least one previous transport block to scramble the at least one subsequent transport block.

The at least one memory and the computer program code may be configured to, with the at least one processor, cause the apparatus at least to: receive an acknowledgement from the other apparatus indicating that the at least one transport block has been successfully delivered to the other apparatus or a non-acknowledgement from the other apparatus indicating that the at least one transport block has not been successfully delivered to the other apparatus.

The apparatus may be a base station and the other apparatus may be a terminal.

The at least one memory and the computer program code may be configured to, with the at least one processor, cause the apparatus at least to: receive an acknowledgement from another base station indicating that the at least one transport block has been successfully delivered to the terminal or a non-acknowledgement from the other base station indicating that the at least one transport block has not been successfully delivered to the terminal.

The apparatus may be a terminal and the other apparatus may be a base station.

The at least one memory and the computer program code may be configured to, with the at least one processor, cause the apparatus at least to: receive a retransmission request indicating that the at least one transport block has not been successfully delivered to the base station or no retransmission request indicating that the at least one transport block has been successfully delivered to the base station.

The at least one transport block, the least one previous transport block and/or the least one subsequent transport block may comprise a plurality of transport blocks.

The at least one memory and the computer program code may be configured to, with the at least one processor, cause the apparatus at least to: transmit the at least a subsequent transport block to the other apparatus.

Using the at least one transport block to scramble at least one subsequent transport block may comprise: using the at least one transport block to generate a scrambling sequence; and using the scrambling sequence to scramble the least one subsequent transport block.

Using the at least one transport block to scramble at least one subsequent transport block may comprise: using the at least one transport block and a hash function to generate the scrambling sequence.

According to an aspect there is provided an apparatus comprising circuitry configured to: determine whether at least one transport block has been successfully delivered to another apparatus; and determine whether to use the at least one transport block to scramble at least one subsequent transport block based on whether at the least one transport block has been successfully delivered to the other apparatus.

The circuitry may be configured to: determine that the at least one transport block has been successfully delivered to the other apparatus; and determine to use the at least one transport block to scramble the at least one subsequent transport block.

The circuitry may be configured to: determine that the at least one transport block has not been successfully delivered to the other apparatus; determine that at least one previous transport block has been successfully delivered to the other apparatus; and determine to use the at least one previous transport block to scramble the at least one subsequent transport block.

The circuitry may be configured to: receive an acknowledgement from the other apparatus indicating that the at least one transport block has been successfully delivered to the other apparatus or a non-acknowledgement from the other apparatus indicating that the at least one transport block has not been successfully delivered to the other apparatus.

The apparatus may be a base station and the other apparatus may be a terminal.

The circuitry may be configured to: receive an acknowledgement from another base station indicating that the at least one transport block has been successfully delivered to the terminal or a non-acknowledgement from the other base station indicating that the at least one transport block has not been successfully delivered to the terminal.

The apparatus may be a terminal and the other apparatus may be a base station.

The circuitry may be configured to: receive a retransmission request indicating that the at least one transport block has not been successfully delivered to the base station or no retransmission request indicating that the at least one transport block has been successfully delivered to the base station.

The at least one transport block, the least one previous transport block and/or the least one subsequent transport block may comprise a plurality of transport blocks.

The circuitry may be configured to: transmit the at least a subsequent transport block to the other apparatus.

Using the at least one transport block to scramble at least one subsequent transport block may comprise: using the at least one transport block to generate a scrambling sequence; and using the scrambling sequence to scramble the least one subsequent transport block.

Using the at least one transport block to scramble at least one subsequent transport block may comprise: using the at least one transport block and a hash function to generate the scrambling sequence.

According to an aspect there is provided an apparatus comprising means for: determining whether at least one transport block has been successfully delivered to another apparatus; and determining whether to use the at least one transport block to scramble at least one subsequent transport block based on whether the at least one transport block has been successfully delivered to the other apparatus.

The apparatus may comprise: determining that the at least one transport block has been successfully delivered to the other apparatus; and determine to use the at least one transport block to scramble the at least one subsequent transport block.

The apparatus may comprise: determining that the at least one transport block has not been successfully delivered to the other apparatus; determining that at least one previous transport block has been successfully delivered to the other apparatus; and determining to use the at least one previous transport block to scramble the at least one subsequent transport block.

The apparatus may comprise: receiving an acknowledgement from the other apparatus indicating that the at least one transport block has been successfully delivered to the other apparatus or a non-acknowledgement from the other apparatus indicating that the at least one transport block has not been successfully delivered to the other apparatus.

The apparatus may be a base station and the other apparatus may be a terminal.

The apparatus may comprise: receiving an acknowledgement from another base station indicating that the at least one transport block has been successfully delivered to the terminal or a non-acknowledgement from the other base station indicating that the at least one transport block has not been successfully delivered to the terminal.

The apparatus may be a terminal and the other apparatus may be a base station.

The apparatus may comprise: receiving a retransmission request indicating that the at least one transport block has not been successfully delivered to the base station or no retransmission request indicating that the at least one transport block has been successfully delivered to the base station.

The at least one transport block, the least one previous transport block and/or the least one subsequent transport block may comprise a plurality of transport blocks.

The apparatus may comprise: transmitting the at least a subsequent transport block to the other apparatus.

Using the at least one transport block to scramble at least one subsequent transport block may comprise: using the at least one transport block to generate a scrambling sequence; and using the scrambling sequence to scramble the least one subsequent transport block.

Using the at least one transport block to scramble at least one subsequent transport block may comprise: using the at least one transport block and a hash function to generate the scrambling sequence.

According to an aspect there is provided a method comprising: determining whether at least one transport block has been successfully delivered to another apparatus; and determining whether to use the at least one transport block to scramble at least one subsequent transport block based on whether the at least one transport block has been successfully delivered to the other apparatus.

The method may comprise: determining that the at least one transport block has been successfully delivered to the other apparatus; and determine to use the at least one transport block to scramble the at least one subsequent transport block.

The method may comprise: determining that the at least one transport block has not been successfully delivered to the other apparatus; determining that at least one previous transport block has been successfully delivered to the other apparatus; and determining to use the at least one previous transport block to scramble the at least one subsequent transport block.

The method may comprise: receiving an acknowledgement from the other apparatus indicating that the at least one transport block has been successfully delivered to the other apparatus or a non-acknowledgement from the other apparatus indicating that the at least one transport block has not been successfully delivered to the other apparatus.

The method may be performed by a base station and the other apparatus may be a terminal.

The method may comprise: receiving an acknowledgement from another base station indicating that the at least one transport block has been successfully delivered to the terminal or a non-acknowledgement from the other base station indicating that the at least one transport block has not been successfully delivered to the terminal.

The method may be performed by a terminal and the other apparatus may be a base station.

The method may comprise: receiving a retransmission request indicating that the at least one transport block has not been successfully delivered to the base station or no retransmission request indicating that the at least one transport block has been successfully delivered to the base station.

The at least one transport block, the least one previous transport block and/or the least one subsequent transport block may comprise a plurality of transport blocks.

The method may comprise: transmitting the at least a subsequent transport block to the other apparatus.

Using the at least one transport block to scramble at least one subsequent transport block may comprise: using the at least one transport block to generate a scrambling sequence; and using the scrambling sequence to scramble the least one subsequent transport block.

Using the at least one transport block to scramble at least one subsequent transport block may comprise: using the at least one transport block and a hash function to generate the scrambling sequence.

According to an aspect there is provided a computer program comprising computer executable code which when run on at least one processor is configured to: determine whether at least one transport block has been successfully delivered to another apparatus; and determine whether to use the at least one transport block to scramble at least one subsequent transport block based on whether the at least one transport block has been successfully delivered to the other apparatus.

The computer program may comprise computer executable code which when run on at least one processor is configured to: determine that the at least one transport block has been successfully delivered to the other apparatus; and determine to use the at least one transport block to scramble the at least one subsequent transport block.

The computer program may comprise computer executable code which when run on at least one processor is configured to: determine that the at least one transport block has not been successfully delivered to the other apparatus; determine that at least one previous transport block has been successfully delivered to the other apparatus; and determine to use the at least one previous transport block to scramble the at least one subsequent transport block.

The computer program may comprise computer executable code which when run on at least one processor is configured to: receive an acknowledgement from the other apparatus indicating that the at least one transport block has been successfully delivered to the other apparatus or a non-acknowledgement from the other apparatus indicating that the at least one transport block has not been successfully delivered to the other apparatus.

The at least one processor may be part of a base station and the other apparatus may be a terminal.

The computer program may comprise computer executable code which when run on at least one processor is configured to: receive an acknowledgement from another base station indicating that the at least one transport block has been successfully delivered to the terminal or a non-acknowledgement from the other base station indicating that the at least one transport block has not been successfully delivered to the terminal.

The processor may be part of a terminal and the other apparatus may be a base station.

The computer program may comprise computer executable code which when run on at least one processor is configured to: receive a retransmission request indicating that the at least one transport block has not been successfully delivered to the base station or no retransmission request indicating that the at least one transport block has been successfully delivered to the base station.

The at least one transport block, the least one previous transport block and/or the least one subsequent transport block may comprise a plurality of transport blocks.

The computer program may comprise computer executable code which when run on at least one processor is configured to: transmit the at least a subsequent transport block to the other apparatus.

Using the at least one transport block to scramble at least one subsequent transport block may comprise: using the at least one transport block to generate a scrambling sequence; and using the scrambling sequence to scramble the least one subsequent transport block.

Using the at least one transport block to scramble at least one subsequent transport block may comprise: using the at least one transport block and a hash function to generate the scrambling sequence.

According to an aspect there is provided an apparatus comprising at least one processor and at least one memory including computer code for one or more programs, the at least one memory and the computer code configured, with the at least one processor, to cause the apparatus at least to: determine whether at least one transport block has been successfully delivered to the apparatus; and determine whether to use the at least one transport block to unscramble at least one subsequent transport block based on whether the at least one transport block has been successfully delivered to the apparatus.

The at least one memory and the computer program code may be configured to, with the at least one processor, cause the apparatus at least to: determine that the at least one transport block has been successfully delivered to the apparatus; and determine to use the at least one transport block to unscramble the at least one subsequent transport block.

The at least one memory and the computer program code may be configured to, with the at least one processor, cause the apparatus at least to: determine that the at least one transport block has not been successfully delivered to the apparatus; determine that at least one previous transport block has been successfully delivered to the apparatus; and determine to use the at least one previous transport block to unscramble the at least one subsequent transport block.

The at least one memory and the computer program code may be configured to, with the at least one processor, cause the apparatus at least to: transmit an acknowledgement to a base station indicating that the at least one transport block has been successfully delivered to the apparatus or a non-acknowledgement to the base station indicating that the at least one transport block has not been successfully delivered to the apparatus.

The apparatus may be a terminal.

The apparatus may be a base station.

The at least one memory and the computer program code may be configured to, with the at least one processor, cause the apparatus at least to: transmit a retransmission request to a terminal indicating that the at least one transport block has not been successfully delivered to the base station or no retransmission request to the terminal indicating that the at least one transport block has been successfully delivered.

According to an aspect there is provided an apparatus comprising circuitry configured to: determine whether at least one transport block has been successfully delivered to the apparatus; and determine whether to use the at least one transport block to unscramble at least one subsequent transport block based thereon.

The circuitry may be configured to: determine that the at least one transport block has been successfully delivered to the apparatus; and determine to use the at least one transport block to unscramble the at least one subsequent transport block.

The circuitry may be configured to: determine that the at least one transport block has not been successfully delivered to the apparatus determine that at least one previous transport block has been successfully delivered to the apparatus; and determine to use the at least one previous transport block to unscramble the at least one subsequent transport block.

The apparatus may be a terminal.

The circuitry may be configured to: transmit an acknowledgement to a base station indicating that the at least one transport block has been successfully delivered to the terminal or a non-acknowledgement to the base station indicating that the at least one transport block has not been successfully delivered to the terminal.

The apparatus may be a base station.

The circuitry may be configured to: transmit a retransmission request to a terminal indicating that the at least one transport block has not been successfully delivered to the base station or no retransmission request to the terminal indicating that the at least one transport block has been successfully delivered.

According to an aspect there is provided an apparatus comprising means for: determining whether at least one transport block has been successfully delivered to the apparatus; and determining whether to use the at least one transport block to unscramble at least one subsequent transport block based on whether the at least one transport block has been successfully delivered to the apparatus.

The apparatus may comprise means for: determining that the at least one transport block has been successfully delivered to the apparatus; and determining to use the at least one transport block to unscramble the at least one subsequent transport block.

The apparatus may comprise means for: determining that the at least one transport block has not been successfully delivered to the apparatus; determining that at least one previous transport block has been successfully delivered to the apparatus; and determining to use the at least one previous transport block to unscramble the at least one subsequent transport block.

The apparatus may comprise means for: transmitting an acknowledgement to a base station indicating that the at least one transport block has been successfully delivered to the apparatus or a non-acknowledgement to the base station indicating that the at least one transport block has not been successfully delivered to the apparatus.

The apparatus may be a terminal.

The apparatus may be a base station.

The apparatus may comprise means for: transmitting a retransmission request to a terminal indicating that the at least one transport block has not been successfully delivered to the base station or no retransmission request to the terminal indicating that the at least one transport block has been successfully delivered.

According to an aspect there is provided a method comprising: determining whether at least one transport block has been successfully delivered to the apparatus; and determining whether to use the at least one transport block to unscramble at least one subsequent transport block based on whether the at least one transport block has been successfully delivered to the apparatus.

The method may comprise: determining that the at least one transport block has been successfully delivered to the apparatus; and determining to use the at least one transport block to unscramble the at least one subsequent transport block.

The method may comprise: determining that the at least one transport block has not been successfully delivered to the apparatus; determining that at least one previous transport block has been successfully delivered to the apparatus; and determining to use the at least one previous transport block to unscramble the at least one subsequent transport block.

The method may comprise: transmitting an acknowledgement to a base station indicating that the at least one transport block has been successfully delivered to the apparatus or a non-acknowledgement to the base station indicating that the at least one transport block has not been successfully delivered to the apparatus.

The method may be performed by a terminal.

The method may be performed by a base station.

The method may comprise: transmitting a retransmission request to a terminal indicating that the at least one transport block has not been successfully delivered to the base station or no retransmission request to the terminal indicating that the at least one transport block has been successfully delivered.

According to an aspect there is provided a computer program comprising computer executable code which when run on at least one processor is configured to: determine whether at least one transport block has been successfully delivered to the apparatus; and determine whether to use the at least one transport block to unscramble at least one subsequent transport block based on whether the at least one transport block has been successfully delivered to the apparatus.

The computer program may comprise computer executable code which when run on at least one processor is configured to: determine that the at least one transport block has been successfully delivered to the apparatus; and determine to use the at least one transport block to unscramble the at least one subsequent transport block.

The computer program may comprise computer executable code which when run on at least one processor is configured to: determine that the at least one transport block has not been successfully delivered to the apparatus; determine that at least one previous transport block has been successfully delivered to the apparatus; and determine to use the at least one previous transport block to unscramble the at least one subsequent transport block.

The computer program may comprise computer executable code which when run on at least one processor is configured to: transmit an acknowledgement to a base station indicating that the at least one transport block has been successfully delivered to the apparatus or a non-acknowledgement to the base station indicating that the at least one transport block has not been successfully delivered to the apparatus.

The processor may be part of a terminal.

The processor may be part of a base station.

The computer program may comprise computer executable code which when run on at least one processor is configured to: transmit a retransmission request to a terminal indicating that the at least one transport block has not been successfully delivered to the base station or no retransmission request to the terminal indicating that the at least one transport block has been successfully delivered.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access Management Function
CRC: Cyclic Redundancy Check
CU: Centralized Unit
DN: Data Network
DU: Distributed Unit
gNB: gNodeB
GSM: Global System for Mobile communication
HARQ: Hybrid Automatic Repeat Request
IoT: Internet of Things
LTE: Long Term Evolution
NDI: New Data Indicator
NEF: Network Exposure Function
NR: New Radio
MS: Mobile Station
PDA: Personal Digital Assistant
PDCCH: Physical Downlink Control Channel
PDSCH: Physical Downlink Shared Channel
PUSCH: Physical Uplink Shared Channel
PLS: Physical Layer Security
RAM: Random Access Memory
RAN: Radio Access Network
ROM: Read Only Memory
SMF: Session Management Function
TB: Transport block
TRP: Transmit Receive Point
UE: User Equipment
UMTS: Universal Mobile Telecommunication System
URLLC: Ultra Reliable Low Latency Communication
USB: Universal Serial Bus
3G: $3^{rd}$ Generation
3GPP: $3^{rd}$ Generation Partnership Project
4G: $4^{th}$ Generation
5G: $5^{th}$ Generation
5GC: 5G Core network
5GRAN: 5G Radio Access Network
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
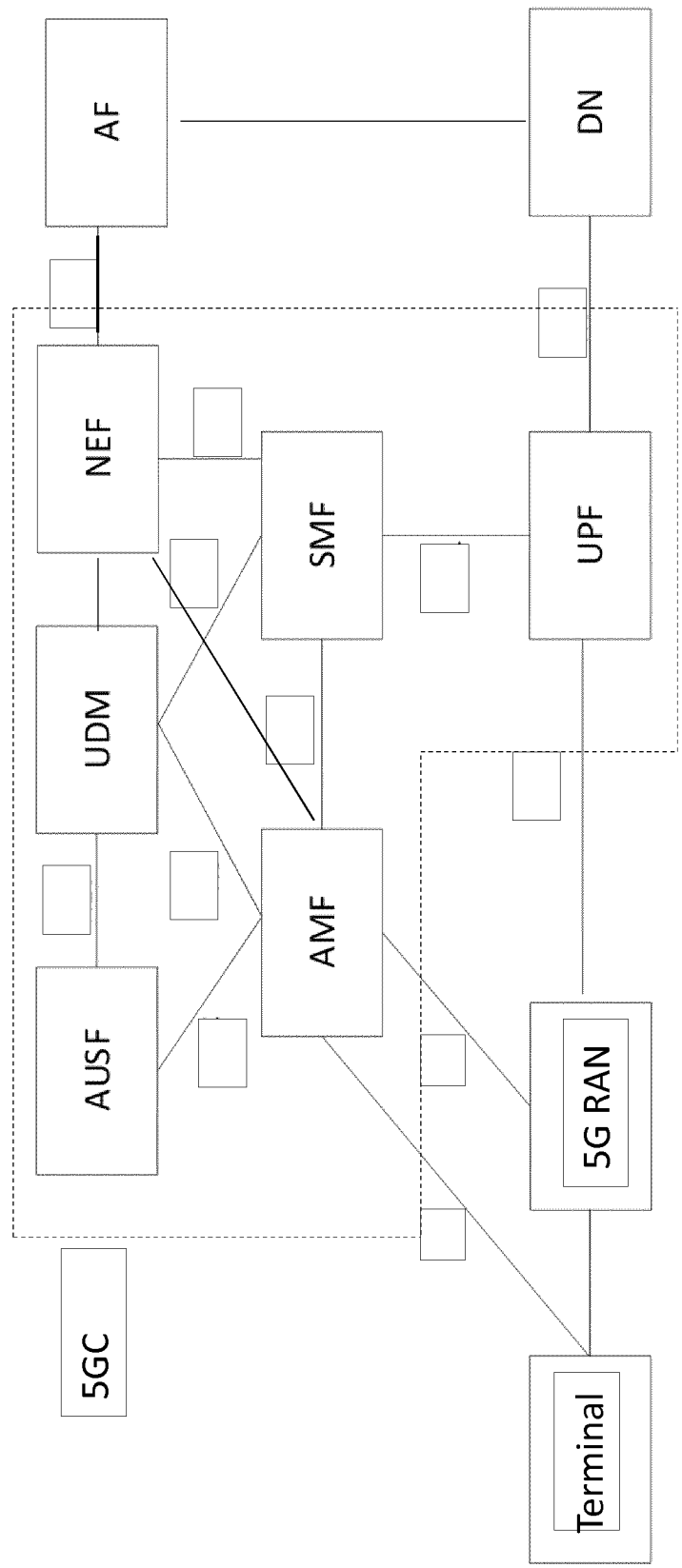
FIG. 1 shows a schematic representation of a 5G system (5GS)

FIG. 1 shows a schematic representation of a 5G system (5GS). The 5GS may comprises a terminal, a 5G radio access network (5G RAN), a 5G core network (5GC), one or more application function (AF) and one or more data networks (DN).

The 5G RAN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF) and/or a network exposure function (NEF).

Figure 2:
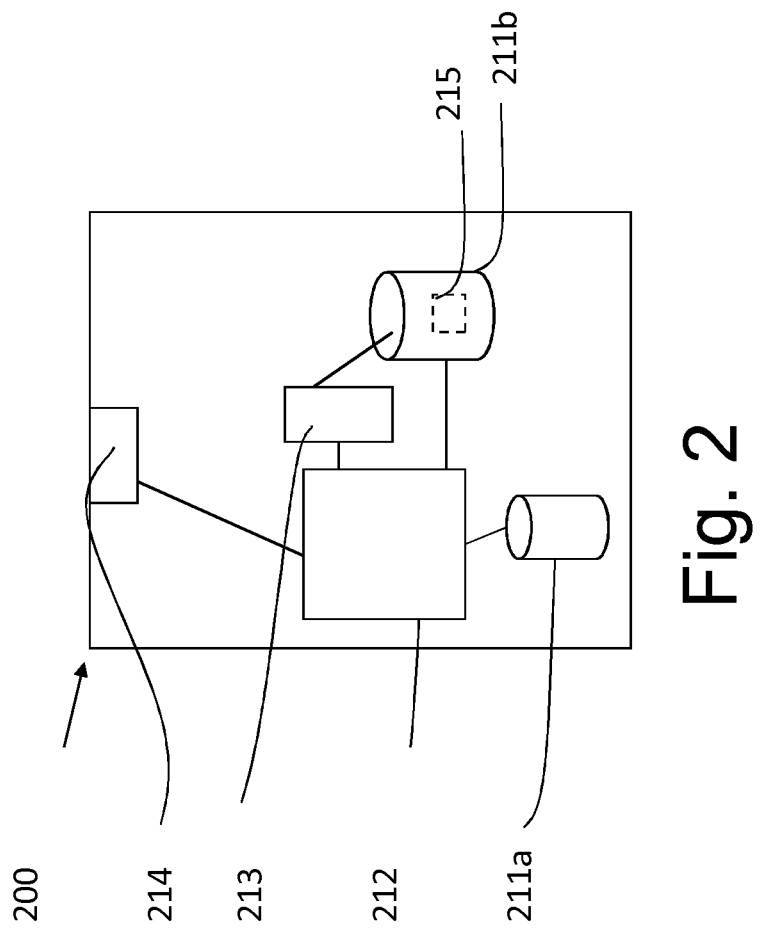
FIG. 2 shows a schematic representation of a control apparatus.

FIG. 2 illustrates an example of a control apparatus 200 for controlling a function of the 5G RAN or 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function the 5G RAN or 5GC. In some embodiments, each function of the 5G RAN or 5GC comprises a control apparatus 200. In alternative embodiments, two or more functions of the 5G RAN or 5GC may share a control apparatus.

Figure 3:
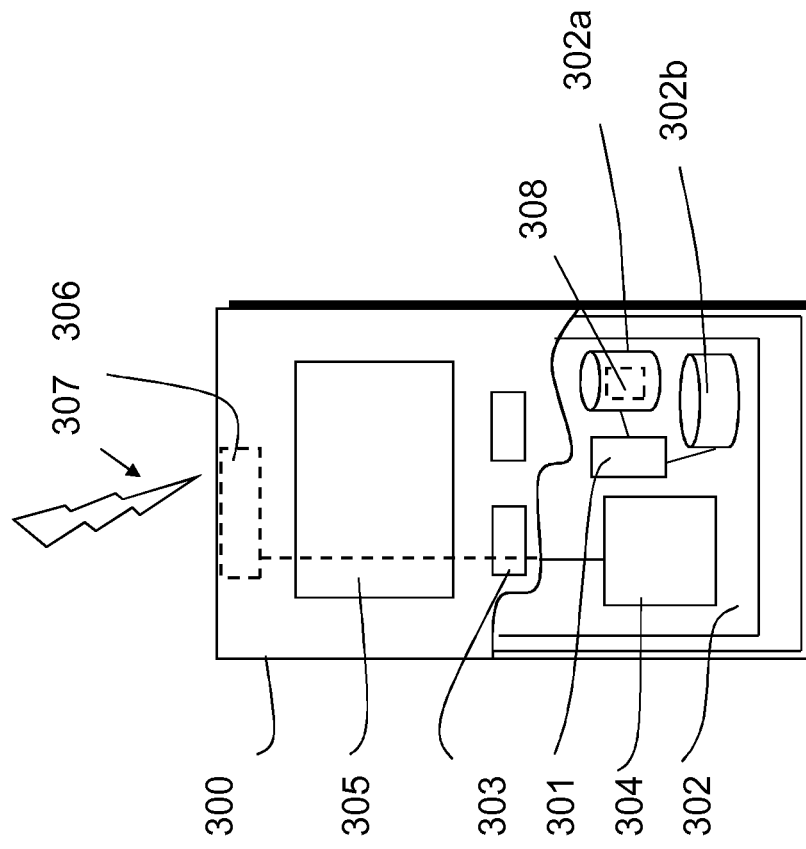
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the present aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more of the preceding and following aspects relate to 5GS, it will be understood that similar aspects may relate to other systems.

One or more of the following aspects relate to cryptography. The field of modern cryptography may be divided into two schools: information-theoretic security and complexity-based security. In the past, only complexity-based security was applied. Information-theoretic security is a fundamentally different paradigm that is based on information insufficiency and does not depend on computational hardness. In other words, it cannot be broken even if the adversary had unlimited computing power. Since the adversary simply does not have enough information to break the encryption, the cryptosystems are considered cryptanalytically-unbreakable.

One or more of the following aspects relate to solutions which enable physical layer security (PLS), that is security based on information theory, to complement and improve the communication security of wireless networks.

The basic key idea behind PLS is to utilize the intrinsic randomness of the transmission channel (i.e. the uniqueness of the channel model) between two physical positions in space and time (which physical parameters randomly evolves on a less-than-a-second basis), to guarantee the security at physical layer.

PLS is a good alternative compared to security protocols at higher level in the sense that no priori key-distribution (i.e. no extra information exchange is needed) may be required to ensure secrecy of a wireless communication. Although Symmetric-key cryptosystems may be efficient in term of computation, they may nevertheless introduce a delay in the transmission (e.g. usually are based on block ciphering), and a decrease in the throughput. While, public-key algorithms are computationally expensive, especially on small embedded nodes, and introduce also delay and throughput decrease, but, even worse, they are "energy-consuming" too. Thus, PLS may be a promising alternative for Internet of things (IoT).

Security for IoT systems has developed from a nice-to-have add-on (this holds for embedded solutions as well as for communication standards) to a must-have due to numerous attacks (e.g., against networked cars or medical devices).

There may be a need to design new and robust security protocols based on PLS. Indeed, the ones used at the application level may not efficient and secure enough for the new design of wireless communications emerging with 5G protocols. With careful management and implementation, PLS may be used as an additional level of protection on top of the existing security schemes. As such, they will formulate a well-integrated security solution together that efficiently safeguards the confidential and privacy communication data in 5G wireless networks.

3GPP RAN1 has not considered any specific requirement on PLS in the initial stages of NR. Therefore, data security may be provided only by the higher layers. Security of the transmissions may be improved by incorporating physical layer related components and using them to encrypt the data transmissions.

Figure 4:
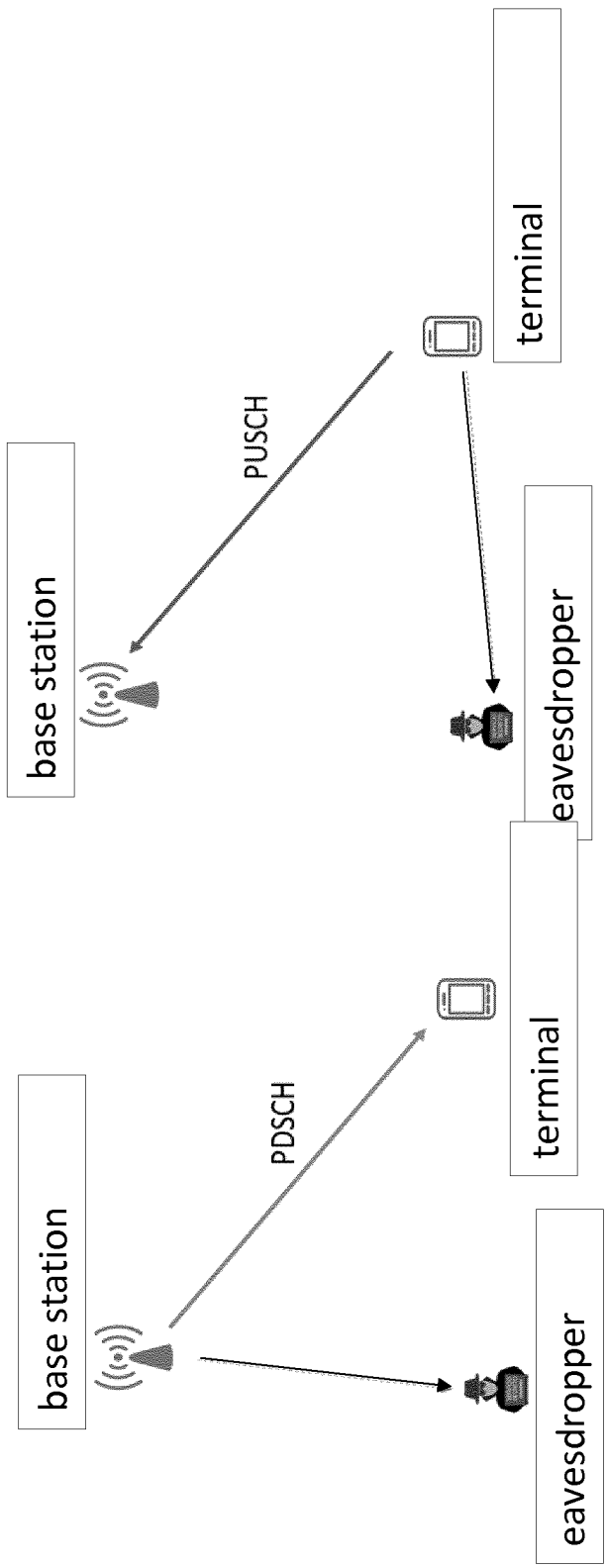
FIG. 4a shows a schematic representation of a deployment comprising a base station, a terminal and an eavesdropper, wherein data is transmitted on a downlink channel.
FIG. 4b shows a schematic representation of a deployment comprising a base station, a terminal and an eavesdropper, wherein data is transmitted on an uplink channel.

FIG. 4a shows a single base station (e.g. single transmit-receive point) scenario wherein an eavesdropper may listen and decode data transmissions between a base station (e.g. gNB) and a terminal (e.g. UE) on a downlink channel, for example on a physical downlink shared channel (PDSCH).

FIG. 4b shows another single base station (e.g. single transmit-receive point) scenario wherein an eavesdropper may listen and decode data transmissions between a base station (e.g. gNB) and a terminal (e.g. UE) on an uplink channel, for example on a physical uplink shared channel (PUSCH).

When data transmissions are listened over a long period of time, the risk that an eavesdropper succeeds in cracking down higher layer security protocols and decoding the exact information is critical. A problem with 5GS is that it provides limited security for data transmissions.

Different techniques on how to handle the situation by using physical layer aspects have been discussed. Most of these discussions were focused on maximized secrecy rate, optimal beamformers, transmit power allocations and some other physical layer aspects. These solutions may be hard to implement due to practical limitations. From the standards point of view, if a PLS solution is introduced in 5GS, the PLS solution should be compatible with existing 5GS requirements.

In light of this, a proposed PLS solution may comprise one or more of the following aspects.

For data transmissions on a downlink channel (e.g. from a base station to a terminal), the base station may use transport block (TB) level data protection by encrypting bits transmitted in the TB.

A TB or set of TBs that is successfully delivered to the terminal may be used to derive a scrambling sequence to scramble another TB sent afterwards by the base station.

The scrambling sequence may be updated based on hybrid automatic repeat request (HARQ) feedback from the terminal. Different scrambling sequences may be used to scramble different TBs.

The scrambling sequence may be derived from a single TB or set of TBs successfully received at the terminal.

Figure 5:
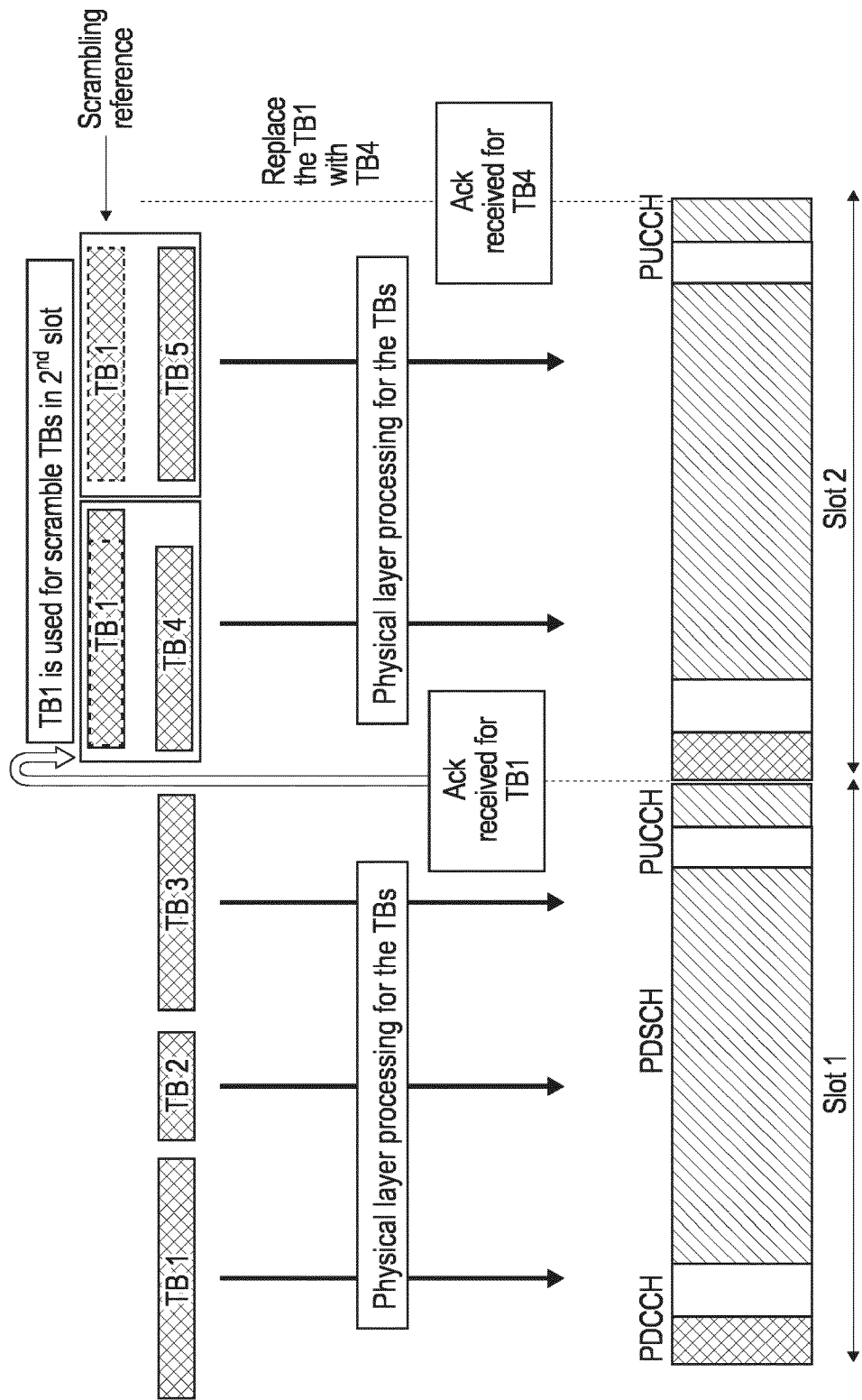
FIG. 5 shows a schematic representation of data transmitted on a downlink channel via transport blocks, wherein transport blocks TB4 and TB5 are processed by a base station based on a previous transport block TB1 successfully delivered to a terminal.

FIG. 5 shows a schematic representation of a proposed PLS solution. TB1, TB2, and TB3 may be transmitted on a downlink channel by a base station in a first slot. HARQ information may be received on an uplink channel by the base station within the first slot before a second slot is scheduled. More specifically, on the downlink channel may be a PDSCH. The uplink channel may be a physical uplink control channel (PUCCH).

The HARQ information may comprise an acknowledgement (HARQ-ACK) indicating that one or more of TB1, TB2, and TB3 has been successfully delivered to a terminal.

Alternatively, the HARQ information may comprise a non-acknowledgement (HARQ-NACK) indicating that one or more of TB1, TB2, and TB3 has not been successfully delivered to a terminal.

A HARQ-ACK may indicate that TB1 has been successfully delivered to a terminal. The base station may use TB1 as a scrambling reference. The base station may use the scrambling reference to derive a scrambling sequence. The base station may use the scrambling sequence to scramble TB4 and TB5 scheduled in the second slot. The base station may transmit TB4 and TB5 in the second slot.

The terminal may receive TB4 and TB5 in the second slot. The terminal may use TB1 as a scrambling reference. The terminal may use the scrambling reference to derive a scrambling sequence to unscramble TB4 and TB5.

Likewise, a HARQ-ACK may indicate that TB4 has been successfully delivered to the terminal. The base station may use TB4 as a scrambling reference. The base station may use the scrambling reference to derive a scrambling sequence. The base station may use the scrambling sequence to scramble TB6 (not illustrated) scheduled in a third slot (not illustrated). The base station may transmit TB6 in the third slot.

The terminal may receive TB6 in the third slot. The terminal may use TB4 as a scrambling reference. The terminal may use the scrambling reference to derive a scrambling sequence to unscramble TB6.

In other words, in the above PLS solution, the base station may scramble at least one TB that are scheduled using a scrambling sequence derived from at least one TB for which an ACK has been received from the terminal. In this way, the risk for an eavesdropper to maliciously decode data transmissions on the downlink channel is reduced.

It will be understood that the size of TB1 (i.e. the scrambling reference) and TB4 and TB5 may be different and such difference may be taken into consideration when deriving the scrambling sequence to scramble TB4 and TB5.

If the size of TB4 or TB5 is smaller than the size of TB1, part of TB1 may be used to derive the scrambling sequence to scramble TB4 or TB5. To the contrary, if the size of TB4 or TB5 is equal to or greater than the size of TB1, the whole TB1 may be used to derive the scrambling sequence to scramble the TB4 or TB5.

Alternatively, if the size of TB4 or TB5 is equal to or greater than the size of TB1, the whole of TB1 may be used to derive a first part of the scrambling sequence to scramble TB4 or TB5 and part of TB1 may be used to derive a second part of the scrambling sequence to scramble TB4 or TB5. For example, the whole of TB1 may be used to derive a least significant part (i.e. least significant bits) of the scrambling sequence to scramble TB4 or TB5 and a least significant part (i.e. least significant bits) of TB1 may be used to derive a most significant part (i.e. most significant bits) of the scrambling sequence to scramble TB4 or TB5.

It may be possible to use more than one TB in the scrambling sequence generation. For example, if the base station receives a HARQ-ACK for TB1 and TB2 but does not receive a HARQ-ACK for TB3, both TB1 and TB2 may be used as the scrambling reference and the scrambling reference may be used to derive the scrambling sequence to scramble TB4 and TB5. The terminal may similarly use TB1 and TB2 as the scrambling reference and the scrambling reference may be used to derive the scrambling sequence to unscramble TB4 and TB5.

It may also be possible to use a function, such as a HASH function, in the scrambling sequence generation with one or more TBs or part of one or more TBs successfully delivered to the terminal. For example, if the base station receives a HARQ-ACK for TB1, TB1 may be used as the scrambling reference and both the scrambling reference and a HASH function may be used to derive the scrambling sequence to scramble TB4 and TB5. The terminal may similarly use TB1 as the scrambling reference and may use both the scrambling reference and a HASH function to derive the scrambling sequence to unscramble TB4 and TB5.

It will be understood that other ways of generating the scrambling sequence are possible using HARQ-ACK and one or more TBs associated with the HARQ-ACK.

It will also be understood that one or more aspects of the proposed PLS solution are not limited to single base station (i.e. single TRP) scenarios. One or more aspects of the proposed PLS solution are also applicable to multiple base stations (i.e. multiple TRPs) scenarios.

Figure 6:
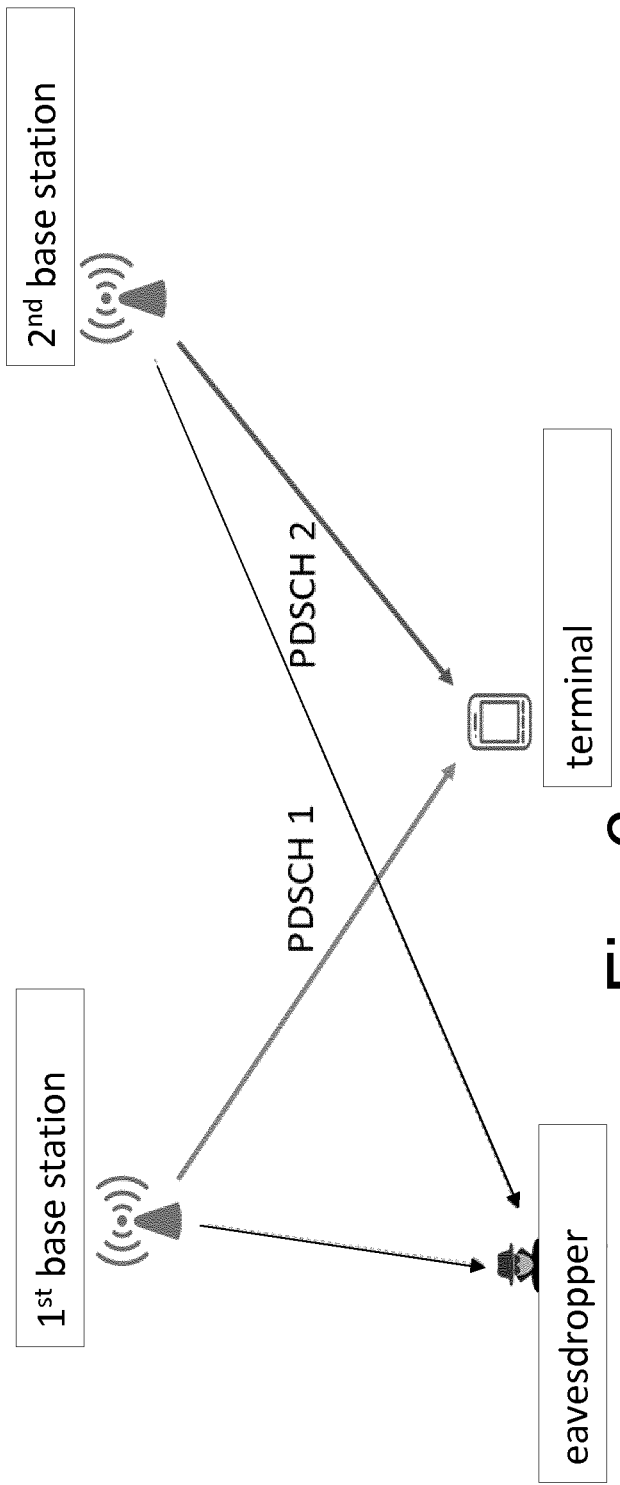
FIG. 6 shows a schematic representation of a deployment comprising multiple base stations, a terminal and an eavesdropper, wherein data is transmitted on multiple downlink channels.

FIG. 6 shows a multiple base stations (e.g. multiple TRPs) scenario wherein an eavesdropper may listen and decode data transmissions between a first base station (e.g. gNB1) and a terminal on a first downlink channel (e.g. PDSCH1) and may listen and decode data transmissions between a second base station (e.g. gNB2) and a terminal (e.g. UE) on a second downlink channel.

TBs transmitted by the second base station to the terminal and successfully delivered to the terminal may be used as a scrambling reference by the first base station. The first base station may use the scrambling reference to derive a scrambling sequence to scramble subsequent TBs transmitted by the first base station to the terminal.

Similarly TBs transmitted by the first base station to the terminal and successfully delivered to the terminal may be used as a scrambling reference by the second base station. The second base station may use the scrambling reference to derive a scrambling sequence to scramble subsequent TBs transmitted by the second base station to the terminal.

In other words, the first base station and the second base station may use cross HARQ information to derive the scrambling sequence to scramble subsequent TBs transmitted by the first base station and the second base station to the terminal.

It will be understood that one or more aspects of the PLS solution discussed above are not limited to data transmissions on a downlink channel. One or more aspects of the PLS solution discussed above are also applicable to data transmissions on an uplink channel. The uplink channel may be a physical uplink shared channel (e.g. PUSCH).

Uplink channel related enhancements may follow a similar mechanism by assuming uplink grant for a new transmission acts as the HARQ-ACK feedback. A terminal may figure out whether a TB transmitted on an uplink channel is successfully delivered or not by a base station based on the presence or absence of retransmission request from the base station. If the base station does not send a retransmission request (i.e., DCI 0_0/0_1 with NDI field is not toggled) for a certain period of time, the terminal may assume that the TB transmitted on an uplink channel is successfully received and decoded by the base station. Therefore, if there is no retransmission request coming from the base station, the terminal may use that TB transmitted on an uplink channel as a scrambling reference and may use the scrambling reference to derive a scrambling sequence to scramble subsequent TBs transmitted on an uplink channel.

Figure 7:
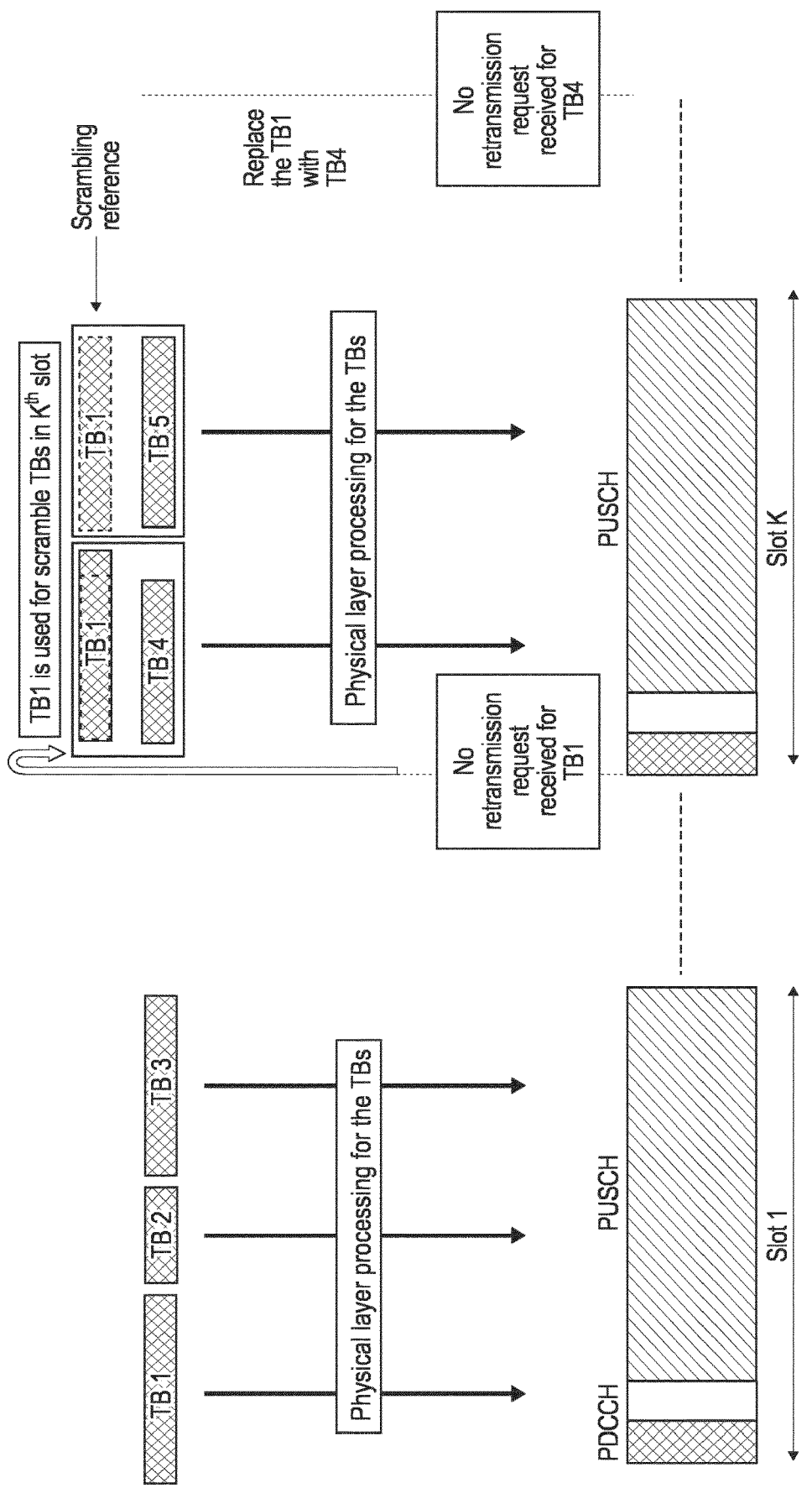
FIG. 7 shows a schematic representation of data transmitted on an uplink channel via transport blocks, wherein transport blocks TB4 and TB5 are processed by a terminal based on a previous transport block TB1 successfully delivered to a base station.

FIG. 7 shows a schematic representation of a PLS solution for data transmissions on an uplink channel. Here, TB1, TB2, and TB3 may be transmitted by a terminal in a first slot. TB1, TB2 and TB3 may be transmitted on PUSCH. Before a kth slot is scheduled by the terminal, the terminal may determine that no retransmission request has been received from a base station for TB1. The retransmission request may be received on a downlink channel, such as a physical downlink control channel (e.g. PDCCH). The terminal may assume that TB1 has been successfully delivered to the base station. The terminal may use TB1 as a scrambling reference and may use the scrambling reference to derive a scrambling sequence to scramble TB4 and TB5 scheduled on a kth slot. The terminal may transmit TB4 and TB5 on the kth slot. The base station may receive TB4 and TB5 on the kth slot. The base station may use TB1 as a scrambling reference and may use the scrambling reference to derive a scrambling sequence to unscramble TB4 and TB5.

Subsequently, the terminal may determine that no retransmission request has been received from the base station for TB4. The terminal may assume that TB4 has been successfully delivered to the base station. The terminal may use TB4 as a scrambling reference and may use the scrambling reference to derive a scrambling sequence to scramble TB6 (not illustrated) scheduled on a k+1th slot (not illustrated). The terminal may transmit TB6 on the k+1th slot. The base station may receive TB6 on the k+1th slot. The base station may use TB4 as a scrambling reference and may use the scrambling reference to derive a scrambling sequence to unscramble TB6.

Figure 8:
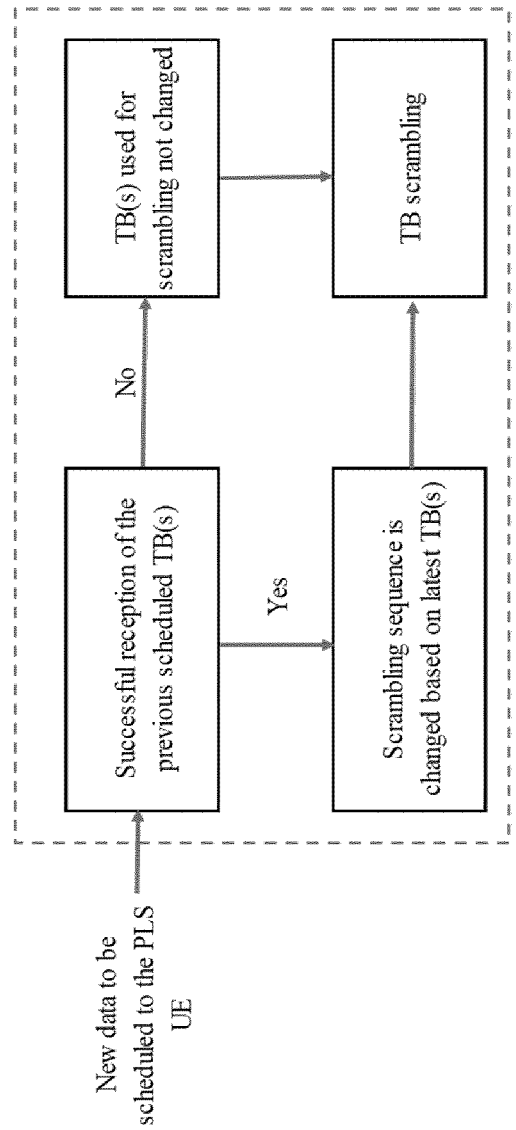
FIG. 8 shows a schematic representation of a method performed by a transmitting side for processing at least one transport block based on at least one previous transport block successfully delivered to a receiving side.

FIG. 8 shows a schematic representation of a method performed by a transmitting side for processing at least one transport block based on at least one previous transport block successfully delivered to a receiving side. The transmitting side may comprise a single base station (e.g. gNB). The receiving side may comprise a PLS capable terminal (e.g. UE).

When new TBs are available at the base station side and are scheduled for the PLS capable terminal, the base station may check received HARQ-ACK for TBs previously scheduled for the PLS capable terminal. If TBs previously scheduled for the PLS capable terminal have been acknowledged by the PLS capable terminal I, the base station may derive a new scrambling sequence to scramble the new TBs based on the TBs previously scheduled for the PLS capable terminal. The scrambling sequence is also derivable by the PLS capable terminal (as the generation of the scrambling sequence may be predefined). If the TBs previously scheduled for the PLS capable terminal have not been acknowledged, then an existing scrambling sequence is used to scramble the new TBs. The TB level scrambling may be applied before cyclic redundancy check (CRC) attachment. CRC may be attached to the scrambled TB.

A possible implementation on single TB based scrambling in the RAN1 specifications (TS 38.212) may be as follows.

7.2 Downlink shared channel and paging channel 7.2.0 Transport block protection

If the transport block level encryption is applied, the following step is additionally applied to the physical layer procedure. Denote the bits in a transport block delivered to layer 1 by $a_0', a_1', a_2', a_3', \ldots, a_{A-1}'$ and the previous transport block that successfully decoded by and indicated by UE is $c_0, c_1, c_2, c_3, \ldots, c_{C-1}$, where A and C are the payload sizes of the transport block and previous transport block respectively.

The bit sequence $a_0', a_1', a_2', a_3', \ldots, a_{A-1}'$ is scrambled into a bit sequence $a_0', a_1', a_2', a_3', \ldots, a_{A-1}'$, by the following, $$\text{for } i = 0: A - 1$$
$$a_i = (a_i' + c_{i-(\lceil i/c \rceil - 1)c}) \bmod 2$$
$$\text{end for}$$

7.2.1 Transport block CRC attachment

Error detection is provided on each transport block through a Cyclic Redundancy Check (CRC).

The entire transport block or encrypted transport block when section 7.2.0 is applied is used to calculate the CRC parity bits. Denote the bits in a transport block delivered to layer 1 (or encrypted transport block) by $a_0', a_1', a_2', a_3', \ldots, a_{A-1}'$, and the parity bits by $p_0, p_1, p_2, p_3, \ldots, p_{L-1}$, where A is the payload size and L is the number of parity bits. The lowest order information bit $a_0$ is mapped to the most significant bit of the transport block as defined in Subclause 6.1.1 of [TS38.321].

The parity bits are computed and attached to the DL-SCH transport block according to Subclause 5.1, by setting L to 24 bits and using the generator polynomial $g_{CRC24A}(D)$ if A>3824; and by setting L to 16 bits and using the generator polynomial $g_{CRC16}(D)$ otherwise.

The bits after CRC attachment are denoted by $b_0$, $b_1$, $b_2$, $b_3$, . . . , $b_{B-1}$, where B=A+L.

It may be possible that HARQ-ACK is not received correctly or lost at a base station and the base station may not be provided with a scrambling sequence update. In such scenario a terminal may apply a new scrambling sequence (different from the scrambling sequence applied by the base station) as a TB is successfully received and HARQ-ACK is transmitted by the terminal to the base station.

This may not be a problem as the terminal may keep track of previous scrambling sequences and may check these previous scrambling sequences without going through a separate decoding process. In other words, CRC check with previous scrambling sequences may be possible.

This may also allow a terminal to further understand that HARQ-ACK is not received correctly at the base station. This works as an implicit way of determining HARQ-ACK error on an uplink channel.

Further information may be sent together with the latest HARQ-ACK such that a base station does not waste resources by scheduling retransmissions for the TBs that lost HARQ-ACK.

The above problem may not arise when scrambling is performed per HARQ process and new TBs are not scheduled until the HARQ-ACK is received correctly for that HARQ process. Therefore, the scrambling sequence may change per HARQ process and both base station and terminal may update the scrambling sequences without any contradictions. When the new data indicator (NDI) in downlink control information (DCI) is not toggled (for retransmissions of the previous TBs), the sequence used for TB scrambling may not be updated. Otherwise, the sequence used for TB scrambling may be updated based on previous TBs.

A single TB or multiple TBs may be used in the generation of the scrambling sequence. The scrambling sequence may be obtained using a scheme more complex than the simplified scheme illustrated above in the TS 38.212 update. For example, one or more of the following aspects may be implement.

The first TB scheduled for the terminal may be used to scramble all remaining TBs.

The scrambling sequence may be used for a fixed transmission period and the same TB may be used as a scrambling reference over that time period to derive the scrambling sequence. The base station and the terminal may maintain a timer that is synchronized to update the scrambling reference and therefore the scrambling sequence. Updates may be based on the latest acknowledged TB.

The scrambling sequence may be used for a variable transmission period. There may be some trigger coming from the base station, and once that received, the terminal may update the scrambling reference and therefore the scrambling sequence based on the latest acknowledged TB.

The first acknowledged TB and all other successfully acknowledged TBs may be cascaded to generate the scrambling sequence. That is, the scrambling sequence may not only depend on the first acknowledged TB, but also on all subsequent acknowledged TBs. For example, cascading may comprise XORing all TBs acknowledged by the terminal to derive a scrambling sequence. The scrambling sequence may be used to scramble subsequent TBs and to derive subsequent scrambling sequences.

It will be understood that XOR has been providing as a non-limiting example of a function to cascade TBs and other functions may be used.

Assume that TBs in FIG. 5 belong to the same HARQ process. If HARQ-ACK for TB2 and TB3 is received at the same time as TB1, then TB1, TB2 and TB3 may be used as the scrambling reference and TB4 and TB5 may be scrambled using a scrambling sequence derived based on TB1, TB2 and TB3. The scrambling sequence may be derived by XORing TB1, TB2 and TB3. In the third slot, if HARQ-ACK for TB4 and TB5 is received, then the previous scrambling sequence, TB4 and TB5 may be used as the scrambling reference and TB6 may be scrambled using a scrambling sequence derived based on the previous scrambling sequence, TB4 and TB5. The scrambling sequence may be derived by XORing the previous scrambling sequence, TB4 and TB5. In this way, the base station and the terminal do not have to maintain all the knowledge of all TBs successfully delivered to the terminal over time.

A single acknowledged TB or a set of acknowledged TBs may be used as the scrambling reference to derive the scrambling sequence. When a set of acknowledged TBs are used as the scrambling reference, the set may be defined over a given time period (e.g. last two slots).

As discussed above, most of the above aspects are valid for data transmission on the downlink (e.g. on PDSCH) but may also be applied to data transmission on the uplink (e.g. PUSCH). As 5GS may not support HARQ-ACK for uplink, the indication that the same scrambling sequence or a different scrambling sequence is used to scramble TBs may depend on an uplink grant received by the base station. If retransmissions are scheduled, the same scrambling sequence may be applied. Otherwise, the scrambling sequence may be updated based on the latest TBs successfully delivered at the base station.

Also, as discussed above, most of the above aspects are valid for single base station (e.g. single TRP) scenarios but may also be applied to multiple base stations (e.g. multiple TRPs) scenarios. Some aspects may however be modified. For example, a scrambling sequence may be derived by a first base station based on the TB successfully received by a terminal from a second base station.

In Rel-16, ongoing multiple base stations transmission assumes that the same TB or different TBs are scheduled at different base stations such that diversity may be improved. Depending on the ideal/non-ideal backhaul situation and control overheads, single PDCCH or multiple PDCCH may be used to schedule multiple base stations transmissions.

Multiple PDCCH design allows to support separate TBs from different base stations. HARQ-ACK for these TBs may be joint or separate as well. If HARQ-ACK is joint, then the HARQ-ACK information may not be exchanged between base stations. Otherwise, HARQ-ACK information may be exchanged between base stations.

Also, exchanging the same TB among multiple base stations is considered in ultra reliable low latency communication (URLLC) related multiple base stations enhancements in Rel-16 (the same TB repeated among different base stations). Some TBs that are used to derive a scrambling sequence may be exchanged between base stations.

Figure 9:
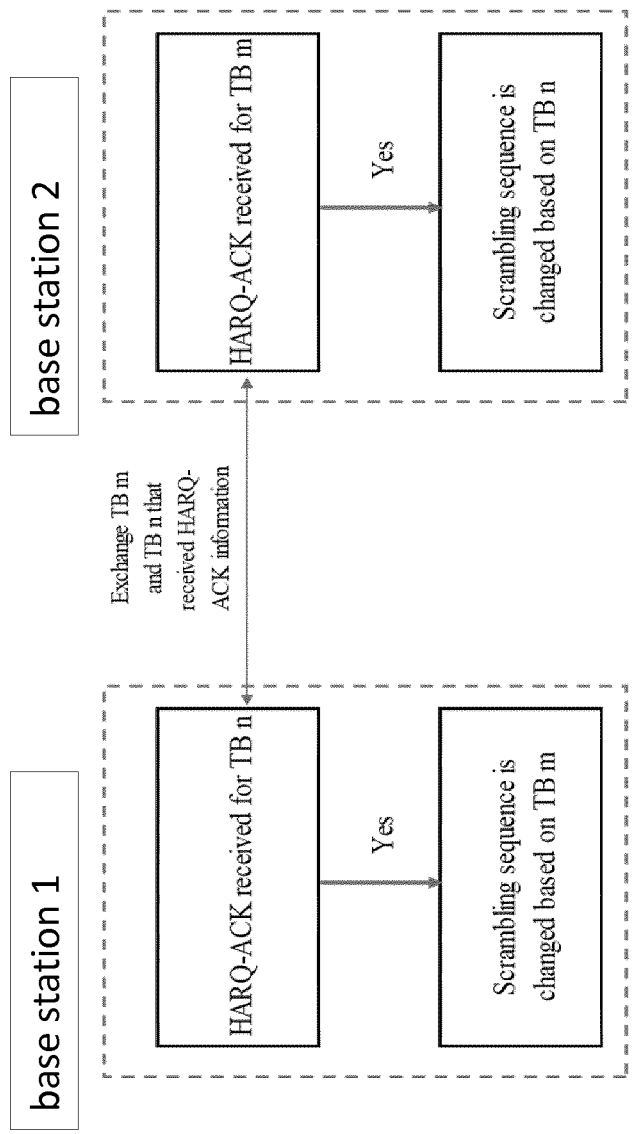
FIG. 9 shows a schematic representation of a method performed by a transmitting side for processing at least one transport block based on at least one previous transport block successfully delivered to a receiving side, wherein transmitting side comprises multiple base stations.

FIG. 9 shows a schematic representation of a method performed by a transmitting side for processing at least one transport block based on at least one previous transport block successfully delivered to a receiving side, wherein transmitting side comprises multiple base stations. The transmitting side may comprise a first base station and a second base station. The receiving side may comprise a terminal.

A first base station may receive HARQ-ACK for TBn from a terminal. A second base station may receive HARQ-ACK for TBm from the terminal. The first base station and the second base station may exchange TBn and TBm. The first base station may use TBm as a scrambling reference to derive a scrambling sequence to scramble subsequent TBs transmitted to the terminal. The second base station may use TBn as a scrambling reference to derive a scrambling sequence to scramble subsequent TBs transmitted to the terminal.

Figure 10:
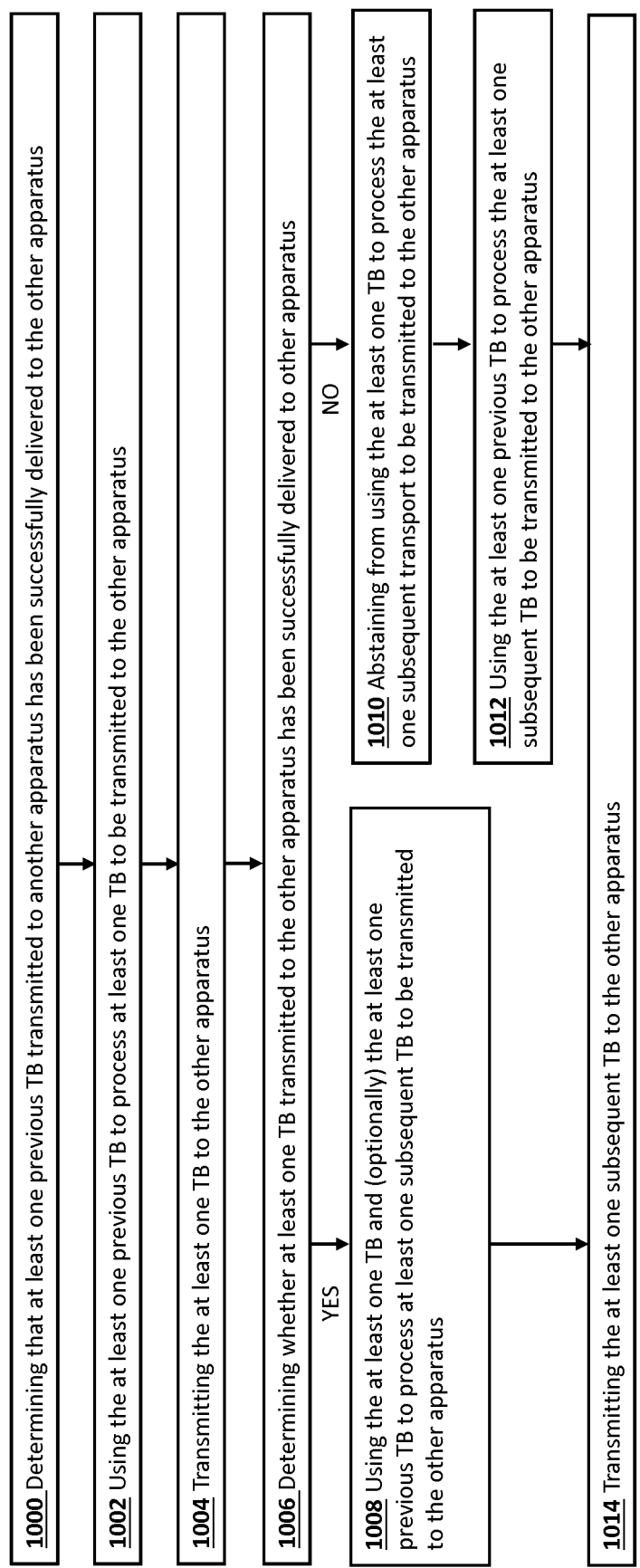
FIG. 10 shows a schematic representation of a method for performing data transmissions in a cellular network implemented on a transmitting side.

FIG. 10 shows a schematic representation of a method for performing data transmissions in a cellular network implemented on a transmitting side according to one or more of the preceding aspects.

In step 1000, an apparatus may determine that at least one previous TB (e.g. TB1 in FIGS. 5 and 7) transmitted to another apparatus has been successfully delivered to the other apparatus. The determination may be based on an indication provided (directly or indirectly) by the other apparatus to the apparatus.

When data transmissions is performed on a downlink channel, the apparatus may be a base station and the other apparatus may be a terminal. When data transmissions is performed on an uplink channel, the apparatus may be a terminal and the other apparatus may be a base station.

In step 1002, the apparatus may use the at least one previous TB (e.g. TB1 in FIGS. 5 and 7) successfully delivered to the other apparatus to process at least one TB (e.g. TB4 in FIGS. 5 and 7) to be transmitted to the other apparatus. The processing may encompass scrambling, encrypting, encoding or any other type of processing to transform an unobscured TB into an obscured TB (all these terms are used interchangeably in this disclosure).

In step 1004, the apparatus may transmit the at least one TB (e.g. TB4 in FIGS. 5 and 7) to the other apparatus.

In step 1006, the apparatus may determine whether the at least one TB (e.g. TB4 in FIGS. 5 and 7) transmitted to the other apparatus has been successfully delivered to other apparatus.

If the apparatus determines that the at least one TB (e.g. TB4 in FIGS. 5 and 7) has been successfully delivered to other apparatus, the method may go to step 1008. If the apparatus determines that the at least one TB (e.g. TB4 in FIGS. 5 and 7) has not been successfully delivered to other apparatus, the method may go to step 1010.

In step 1008, the apparatus may use the at least one TB (e.g. TB4 in FIGS. 5 and 7) successfully delivered to the other apparatus and (optionally) the at least one previous TB (e.g. TB1 in FIGS. 5 and 7) also successfully delivered to the other apparatus to process at least one subsequent TB (e.g. TB6 in FIGS. 5 and 7) to be transmitted to the other apparatus. The processing may encompass scrambling, encrypting, encoding or any other type of processing to transform an unobscured TB into an obscured TB (all these terms are used interchangeably in this disclosure).

In step 1010, the apparatus may abstain from using the at least one TB (e.g. TB4 in FIGS. 5 and 7) to process the at least one subsequent transport (e.g. TB6 in FIGS. 5 and 7) to be transmitted to the other apparatus.

In step 1012, the apparatus may use the at least one previous TB (e.g. TB1 in FIGS. 5 and 7) successfully delivered to the other apparatus to process the at least one subsequent TB (e.g. TB6 in FIGS. 5 and 7) to be transmitted to the other apparatus. The processing may encompass scrambling, encrypting, encoding or any other type of processing to transform an unobscured TB into an obscured TB (all these terms are used interchangeably in this disclosure).

In step 1014, the apparatus may transmit the at least one subsequent TB (e.g. TB6 in FIGS. 5 and 7) to the other apparatus.

Figure 11:
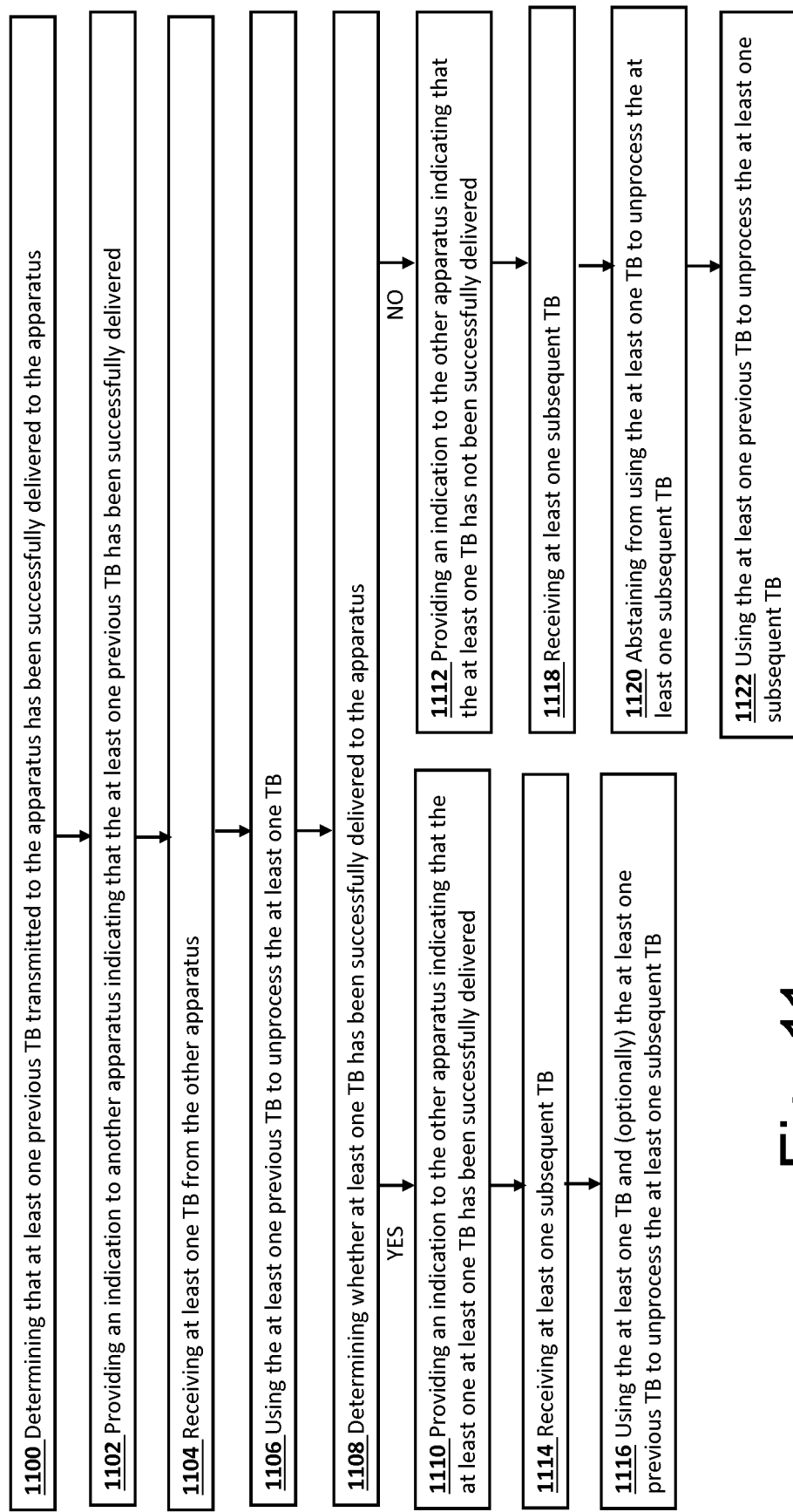
FIG. 11 shows a schematic representation of a method a method for performing data receptions in a cellular network implemented on a receiving side.

FIG. 11 shows a schematic representation of a method for performing data transmissions in a cellular network implemented on a receiving side according to one or more of the preceding aspects.

In step 1100, an apparatus may determine that at least one previous TB (e.g. TB1 in FIGS. 5 and 7) transmitted to the apparatus has been successfully delivered to the apparatus.

When data transmissions is performed on a downlink channel, the apparatus may be a terminal. When data transmissions is performed on an uplink channel, the apparatus may be a base station.

In step 1102, the apparatus may provide an indication (directly or indirectly) to another apparatus indicating that the at least one previous TB (e.g. TB1 in FIGS. 5 and 7) has been successfully delivered to the apparatus.

When data transmissions is performed on a downlink channel, the other apparatus may be a base station. When data transmissions is performed on an uplink channel, the apparatus may be a terminal.

In step 1104, the apparatus may receive at least one TB (e.g. TB4 in FIGS. 5 and 7) from the other apparatus. The at least one TB (e.g. TB4 in FIGS. 5 and 7) may be transmitted by the other apparatus after receiving the indication from the apparatus provided in step 1102.

In step 1106, the apparatus may use the at least one previous TB (e.g. TB1 in FIGS. 5 and 7) successfully delivered to the apparatus to unprocess the at least one TB (e.g. TB4 in FIGS. 5 and 7). The unprocessing may encompass unscrambling, unencrypting, decoding or any other type of unprocessing to transform an obscured TB into an unobscured TB (all these terms are used interchangeably in this disclosure).

In step 1108, the apparatus may determine whether at least one TB (e.g. TB4 in FIGS. 5 and 7) has been successfully delivered to the apparatus.

If the at least one TB (e.g. TB4 in FIGS. 5 and 7) has been successfully delivered to the apparatus, the method goes to step 1110. If the at least one TB (e.g. TB4 in FIGS. 5 and 7) has not been successfully delivered to the apparatus, the method goes to step 1112.

In step 1110, the apparatus may provide an indication (directly or indirectly) to the other apparatus indicating that the at least one TB (e.g. TB4 in FIGS. 5 and 7) has been successfully delivered to the apparatus.

In step 1114, the apparatus may receive at least one subsequent TB (e.g. TB6 in FIGS. 5 and 7) from the other apparatus. The at least one subsequent TB (e.g. TB6 in FIGS. 5 and 7) may be transmitted by the other apparatus after receiving the indication from the apparatus provided in step 1110.

In step 1116, the apparatus may use the at least one TB (e.g. TB4 in FIGS. 5 and 7) successfully delivered to the apparatus and (optionally) the at least one previous TB (e.g. TB1 in FIGS. 5 and 7) also successfully delivered to the apparatus to unprocess at least one subsequent TB (e.g. TB6 in FIGS. 5 and 7). The unprocessing may encompass unscrambling, unencrypting, decoding or any other type of unprocessing to transform an obscured TB into an unobscured TB (all these terms are used interchangeably in this disclosure).

In step 1112, the apparatus may provide an indication (directly or indirectly) to the other apparatus indicating that the at least one TB (e.g. TB4 in FIGS. 5 and 7) has not been successfully delivered to the apparatus.

In step 1118, the apparatus may receive at least one subsequent one TB (e.g. TB6 in FIGS. 5 and 7) from the other apparatus. The at least one subsequent TB (e.g. TB6 in FIGS. 5 and 7) may be transmitted by the other apparatus after receiving the indication from the apparatus provided in step 1112.

In step 1120, the apparatus may abstain from using the at least one TB (e.g. TB4 in FIGS. 5 and 7) unsuccessfully delivered to the apparatus to unprocess the at least one subsequent TB.

In step 1122, the apparatus may use the at least one previous TB (e.g. TB1 in FIGS. 5 and 7) to unprocess the at least one subsequent TB (e.g. TB6 in FIGS. 5 and 7). The unprocessing may encompass unscrambling, unencrypting, decoding or any other type of unprocessing to transform an obscured TB into an unobscured TB (all these terms are used interchangeably in this disclosure).

Figure 12:
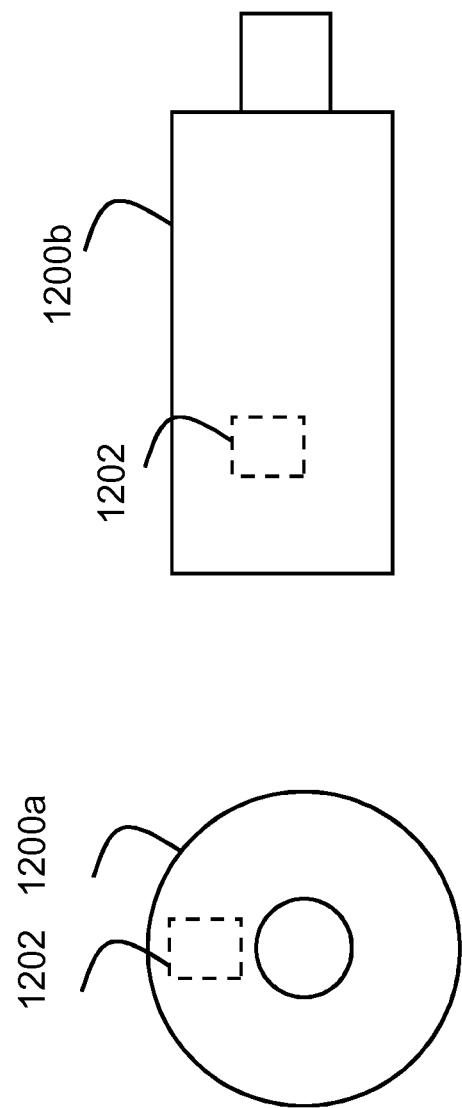
FIG. 12 shows a schematic representation of a non-volatile memory medium storing instructions which when executed by a processor allow a processor to perform one or more of the steps of the above methods.

FIG. 12 shows a schematic representation of non-volatile memory media 1200*a* (e.g. computer disc (CD) or digital versatile disc (DVD) and 1200*b* (e.g. universal serial bus (USB) memory stick) storing instructions and/or parameters 1202 which when executed by a processor allow the processor to perform one or more of the steps of the above methods.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
   (i) a combination of analogue and/or digital hardware circuit(s) with software/firmware and
   (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
   at least one processor; and
   at least one memory including computer program code electrically coupled to the at least one processor;
   the at least one memory and the computer program code configured to, with the at least one processor, cause the apparatus at least to:
   determine whether at least one transport block has been successfully delivered to another apparatus; and
   determine whether to use the at least one transport block to scramble at least one subsequent transport block based on whether the at least one transport block has been successfully delivered to the other apparatus;
   wherein using the at least one transport block to scramble at least one subsequent transport block comprises:

using the at least one transport block to generate a scrambling sequence; and
using the scrambling sequence to scramble the least one subsequent transport block.

2. The apparatus of claim 1, wherein the at least one memory and the computer program code are configured to, with the at least one processor, cause the apparatus at least to:
determine that the at least one transport block has been successfully delivered to the other apparatus; and
determine to use the at least one transport block to scramble the at least one subsequent transport block.

3. The apparatus of claim 1, wherein the at least one memory and the computer program code are configured to, with the at least one processor, cause the apparatus at least to:
determine that the at least one transport block has not been successfully delivered to the other apparatus;
determine that at least one previous transport block has been successfully delivered to the other apparatus; and
determine to use the at least one previous transport block to scramble the at least one subsequent transport block.

4. The apparatus of claim 1, wherein the at least one memory and the computer program code are configured to, with the at least one processor, cause the apparatus at least to:
receive an acknowledgement from the other apparatus indicating that the at least one transport block has been successfully delivered to the other apparatus 1 or a non-acknowledgement from the other apparatus indicating that the at least one transport block has not been successfully delivered to the other apparatus.

5. The apparatus of claim 1, wherein the apparatus is a base station and the other apparatus is a terminal.

6. The apparatus of claim 5, wherein the at least one memory and the computer program code are configured to, with the at least one processor, cause the apparatus at least to:
receive an acknowledgement from another base station indicating that the at least one transport block has been successfully delivered to the terminal or a non-acknowledgement from the other base station indicating that the at least one transport block has not been successfully delivered to the terminal.

7. The apparatus of claim 1, wherein the apparatus is a terminal and the other apparatus is a base station.

8. The apparatus of claim 7, wherein the at least one memory and the computer program code are configured to, with the at least one processor, cause the apparatus at least to:
receive a retransmission request indicating that the at least one transport block has not been successfully delivered to the base station or no retransmission request indicating that the at least one transport block has been successfully delivered to the base station.

9. The apparatus of claim 1, wherein the at least one transport block, the least one previous transport block and/or the least one subsequent transport block comprise a plurality of transport blocks.

10. The apparatus of claim 1, wherein the at least one memory and the computer program code are configured to, with the at least one processor, cause the apparatus at least to:
transmit the at least a subsequent transport block to the other apparatus.

11. The apparatus of claim 1, wherein using the at least one transport block to scramble at least one subsequent transport block comprises:
using the at least one transport block and a hash function to generate the scrambling sequence.

* * * * *